UNITED STATES PATENT OFFICE.

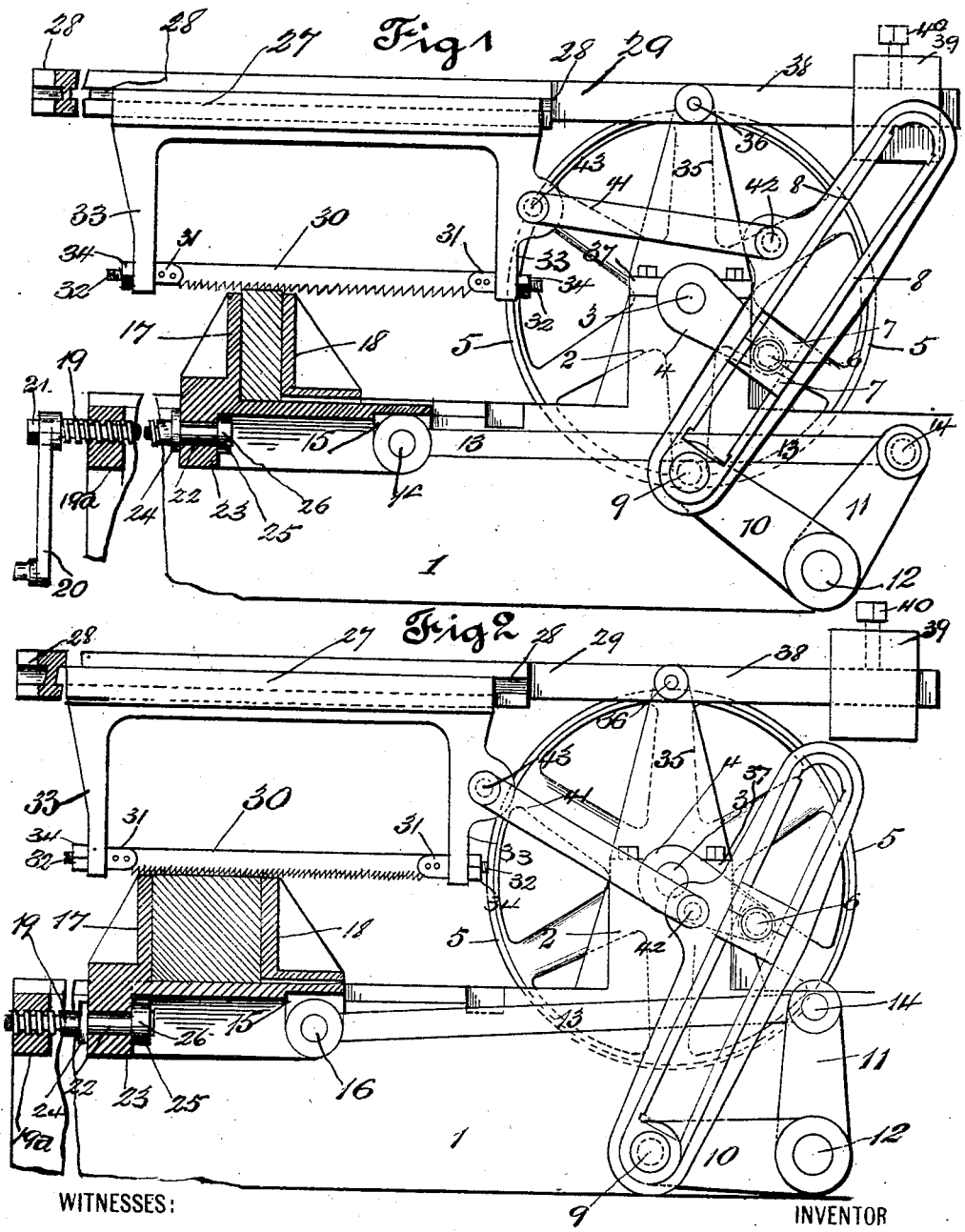

ROBERT C. BERRY, OF INDIANAPOLIS, INDIANA.

POWER-HACKSAW.

No. 907,445.　　　　　Specification of Letters Patent.　　　Patented Dec. 22, 1908.

Application filed December 29, 1906. Serial No. 350,018.

*To all whom it may concern:*

Be it known that I, ROBERT C. BERRY, a citizen of the United States, residing at Indianapolis, in the county of Marion and State of Indiana, have invented certain new and useful Improvements in Power-Hack-saws, of which the following is a specification, reference being had therein to the accompanying drawing.

This invention relates to improvements in power driven hack-saws, and it consists in a stroke modifying and adjusting mechanism controlled by the movable jaw of the vise of the apparatus whereby the saw is set and automatically adjusted to suit the work held in the vise, as will be hereinafter described and particularly pointed out in the claims.

In the majority of power driven hack-saws constructed up to the present time the cranks are so constructed that the throw thereof may be adjusted manually by changing the position of the crank pin on the crank, and by changing the centers of the pitman connecting said crank-pin and the reciprocating saw-frame which are also adjustable, so that, in order to saw or cut pieces of material of different sizes, a special setting of the crank and the pitman must be made. In order to set the saw of the machine so that the entire length of said saw will traverse over the piece to be cut and the full efficiency of the saw be obtained, each different size of material to be cut necessitates a special setting of the machine by the operator before commencing the work on the piece. The accuracy of the setting of the crank and pitman of a machine of this character therefore depends wholly upon the care exercised by the operator to obtain the proper stroke and adjustment of the saw, for if the throw of the crank be made too long the saw frame will travel too far and strike the piece to be cut at each end of its stroke, and if the centers of the pitman are set too far apart or too close the saw will not fully traverse over the work, but will utilize only a portion of either end of the saw.

In order to overcome the above mentioned defects I provide a means for controlling the throw of the crank and connect the same to a traversing jaw of the vise of the machine, whereby the position of the frame relative to the work held in the vise, the crank throw controlling apparatus, and the stroke of said saw frame, are automatically adjusted to cause the saw to traverse its entire length over the piece to be sawed or severed and the saw will reciprocate uniformly throughout its entire length upon the piece operated upon. I attain these objects by means of the automatic stroke modifying mechanism illustrated in the accompanying drawings in which like numerals of reference designate like parts throughout the several views.

Figure 1. is a longitudinal sectional elevational view of my machine showing the crank setting for a small piece of work clamped in the vise: and, Fig. 2. is a similar view showing the setting of the saw frame corresponding to a larger piece of material secured in the vise of the machine.

In order that others skilled in the art be enabled to make and use this invention, I will proceed to describe the same in detail.

The main supporting frame 1 of the machine may be of any suitable form and the same is provided with a journal-box 2 in which the crank-shaft 3 is journaled, and on the end of this shaft is secured the fixed crank 4 and on the opposite end a belt pulley 5 which is provided to revolve the crank-shaft 3. A crank-pin 6 is permanently secured on the end of the crank 4 in any suitable manner and on the said crank-pin is mounted a crank-pin box 7 which is composed of two opposing similar halves or pieces securely bolted together to be removable; and said box has its bore adapted to fit the crank-pin 6.

The box 7 is adapted to fit and to slide longitudinally in the slot of the slotted swinging link 8 which latter is pivotally mounted to swing or rock on its supporting pin 9, carried by the lever 10. The lever 10 is formed integral with the lever 11, and said levers are pivotally mounted on the fixed supporting pin 12 secured to the supporting frame 1.

A connecting rod 13 has one of its ends connected to the crank 11 by a connecting pin 14 and its opposite end to the lug 15 formed integral on the under projecting portion of the traversing jaw 17 of the vise by a connecting pin 16. The fixed jaw 18 of the vise is formed integral with the frame 1. The traversing jaw 17 is traversed by means of a screw 19 which latter is turned by a crank handle 20 which latter is fitted on the square end 21 of said screw to be removable. The neck 22 of the screw 19 is journaled in the bore of the traversing jaw lug 23 and is prevented from moving laterally therein by the integral collar 24 on one side and the removable collar 25 on the other side or on the end of the neck of the said screw, and is held thereon by a pin 26. The screw 19 is screwed into the lug 19ª formed integral on the frame 1, so that when said screw is revolved to traverse the traversing or movable jaw 17 to grip and hold the work between it and its opposing fixed jaw 18, said jaw 17 as it moves it causes the swinging link 8 to move into position through the connecting rod 13 connected to the lever 11 to cause the said link to impart a proper length of stroke to the saw and its frame to suit the work contained in the vise.

A saw-frame 27 is made to traverse on its guides 28 formed on the arm 29. A saw 30 is secured on the end holders 31 which are provided with the screw ends 32 whereby the saw is secured and held in proper tension between the depending arms 33 of the saw frame 27 by the screw nuts 34.

The arm 29 is pivotally mounted on the top end of the upright 35 by a pin 36. The upright 35 is formed integral on the top of the cap 37 of the journal box 2. The counterbalance arm 38 of the guide supporting arm 29 is provided with a counterbalance weight 39 which is adjustably secured on said arm by a set screw 40.

A connecting rod 41 is connected at one end to the link 8 by a connecting pin 42 and at its opposite end to the saw frame 27 by a connecting pin 43, so that with each oscillation or swing of the link 8 the said saw frame 27 will make a stroke corresponding in length to the position of the link 8 relative to its crank 4.

The stroke of the saw frame 27, it it obvious, is modified absolutely by the link 8, and the position of the latter and consequently the position of the pivotal supporting pin 9 relative to the axis of the crank and this mechanism is controlled by the movable jaw of the vise of the machine, as will be hereinafter described. This will be better understood by a reference to Figs. 1 and 2 of the drawing.

In Fig. 1, it will be observed, that a thin piece of material is placed and secured in the vise and it is essential that the jaw 17 of the vise securely grip the material for the purpose of firmly holding said material when being sawed and also to swing the lever arms 11 and 10 to move the pivotal pin 9 into its true position and to maintain it in such position. The link 8 when in this position (the position shown in Fig. 1.) imparts the long or extreme length of stroke to the saw frame 27 to cause the saw 33 to traverse the work to be sawed its entire length. The link 8 imparts to the saw frame a slow movement during its forward stroke and a quick return motion is imparted to the saw frame which feature is peculiar to crank and link mechanisms combined as shown in the drawing.

Referring now to Fig. 2. it will be noted that a thicker piece of material is placed and secured in the vise and, as before, the traversing jaw 17 of the vise is caused to securely clamp the larger piece to be cut or sawed. The widening of the space between the jaws 17 and 18 of the vise of course changes the position of the pin 16 to a more forwardly one than that shown in Fig. 1. The traversing jaw 17 having a position in advance of that shown in Fig. 1 and consequently by reason of the connecting rod 13 being connected to the said traversing jaw 17 and the lever arm 11 formed integral on the lever arm boss of the lever 10, the latter is moved as shown in Fig. 2, and is different from the position shown in Fig. 1, and the link pivotal pin 9 is lowered with relation to the axis of the crank 4, thereby shortening the swing of the connecting pin 42 to impart a shorter stroke in both directions to the saw frame to correspond to the size of the piece to be cut, at the same time, equalizing the stroke of the saw over the piece of material in the vise, that is to say, the saw will not traverse more to the right of the work or piece to be cut than to the left of it, in other words, the saw will be caused to travel its entire length over the piece to be cut and not a portion of the toothed portion of the saw will escape passing over the work or piece to be cut no matter what the size provided it be within the limits of the apparatus. The arm 38 being pivotally mounted on the pin 36, and the guides 28 being formed thereon the latter will swing or descend with said arm carrying the saw frame down with it as the saw 30 cuts away the material.

I claim:—

1. In a power driven saw, the combination with a reciprocating saw-frame, a vise, and a vise-screw, of a saw frame stroke adjusting means, and a means connecting said adjusting means and said vise-screw whereby the stroke imparted by the stroke adjusting means to the saw frame is controlled to automatically regulate the stroke of the saw-frame to correspond to the piece held in the vise.

2. In a power driven saw, the combination with a reciprocating saw frame and a vise one jaw of which is movable, of a saw frame stroke adjusting means and means connecting the stroke adjusting means and said movable jaw whereby the stroke imparted by the stroke adjusting means to the saw is controlled to automatically regulate the stroke of the saw frame to correspond to the piece held in the vise.

3. In a power driven saw, the combination with a reciprocating saw frame, a crank, a slotted swinging link operatively connected to said crank, and a rod connecting said swinging link and said reciprocating saw frame, of a vise one jaw of which is movable, a swinging link carrying pin, an adjustable pin supporting means and means connecting said link carrying pin supporting means and said movable jaw whereby the position of the link will be adjusted to automatically adjust the stroke of the saw to correspond to the size of the work held in the vise.

4. In a power driven saw, the combination with a reciprocating saw frame, a crank having a constant throw, an oscillating slotted link operatively connected to said crank, its supporting pin and means connecting said oscillating slotted link at a fixed point and said saw frame, of a swinging link pin carrying arm, a vise one of the jaws of which is movable and means connecting said carrying arm and said movable vise jaw whereby the link carrying pin is moved to regulate the stroke of the saw frame.

In testimony whereof I affix my signature in presence of two witnesses.

ROBERT C. BERRY.

Witnesses:
    THOMPSON R. BELL,
    FRANCIS M. SPRINGER.